US012641079B2

(12) United States Patent
Albero et al.

(10) Patent No.: US 12,641,079 B2
(45) Date of Patent: May 26, 2026

(54) BIOMETRIC DATA-BASED HOLOGRAPHIC AUTHENTICATION

(71) Applicant: Bank of America Corporation, Charlotte, NC (US)

(72) Inventors: George Anthony Albero, Charlotte, NC (US); Karen Elizabeth Davis, Charlotte, NC (US); Olga Kocharyan, Matthews, NC (US); Elijah Clark, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 176 days.

(21) Appl. No.: 18/378,269

(22) Filed: Oct. 10, 2023

(65) Prior Publication Data

US 2025/0119424 A1 Apr. 10, 2025

(51) Int. Cl.
| | |
|---|---|
| *H04L 9/40* | (2022.01) |
| *G03H 1/00* | (2006.01) |
| *G06F 21/16* | (2013.01) |
| *H04L 9/32* | (2006.01) |

(52) U.S. Cl.
CPC ....... *H04L 63/0861* (2013.01); *G03H 1/0011* (2013.01); *G06F 21/16* (2013.01); *H04L 9/3236* (2013.01); *H04L 63/0838* (2013.01)

(58) Field of Classification Search
CPC ............. H04L 63/0861; H04L 63/0838; H04L 9/0861; G03H 1/0011; G06F 21/16
USPC ........................................................ 713/186
See application file for complete search history.

(56) References Cited

U.S. PATENT DOCUMENTS

| | | | |
|---|---|---|---|
| 5,306,899 | A | 4/1994 | Marom et al. |
| 5,640,255 | A | 6/1997 | Haines |
| 6,078,664 | A * | 6/2000 | Moskowitz ........... G06T 1/0028 |
| | | | 380/263 |
| 6,222,650 | B1 | 4/2001 | Long |
| 8,976,432 | B2 | 3/2015 | Shirakura et al. |
| 9,491,169 | B2 * | 11/2016 | Lee ....................... H04L 9/3228 |
| 9,829,859 | B2 | 11/2017 | Fickes et al. |
| 2002/0080994 | A1 * | 6/2002 | Lofgren ................. G03H 1/041 |
| | | | 382/100 |
| 2004/0201873 | A1 * | 10/2004 | Erickson .............. G11B 23/283 |
| 2014/0380060 | A1 * | 12/2014 | Ganguly ................ H04L 63/00 |
| | | | 713/185 |

(Continued)

*Primary Examiner* — Michael S McNally
(74) *Attorney, Agent, or Firm* — Banner & Witcoff, Ltd.

(57) ABSTRACT

Arrangements for biometric data-based holographic authentication are provided. In some examples, biometric data for a plurality of users may be received. A computing platform may receive a request to process an event. In response to receiving the request to process the event, the computing platform may retrieve biometric data of a requesting user and generate, based on the biometric data, a hologram of the biometric data of the user. In some examples, the hologram may be displayed on a device and provided to an authentication reader device as authentication data. The authentication reader device may capture an image of the hologram and the computing platform may receive the image. The computing platform may compare the captured image of the hologram to the generated hologram to determine whether there is a match. If not, the requested event may be denied. If so, the event may be processed.

20 Claims, 10 Drawing Sheets

(56) References Cited

U.S. PATENT DOCUMENTS

2017/0140144 A1* 5/2017 Bock ........................ G06F 21/40
2021/0226796 A1* 7/2021 Ok ........................ G06K 7/1417

* cited by examiner

110

111

112

Hologram-Based Authentication Computing Platform

Processor(s)

Memory(s)

Registration Module
112a

Hologram Generation Module
112b

Digital Watermarking Module
112c

Hash Generation Module
112d

Notification Generation Module
112e

Database
112f

113

Communication Interface(s)

BIOMETRIC DATA-BASED HOLOGRAPHIC AUTHENTICATION

BACKGROUND

Aspects of the disclosure relate to electrical computers, systems, and devices providing biometric-based holographic authentication.

Controlling access to secure information, spaces and the like, is a priority for enterprise organizations. As most systems rely on biometric data for authentication and providing access, unauthorized users may attempt to capture a user's biometric data using a skimmer device. For instance, an unauthorized user may place a film or other surface on a biometric scanner to capture the biometric data of the user and user the biometric data without authorization from the user. Accordingly, aspects described herein use holograms generated based on biometric data of a user to provide authentication without contacting a surface of the scanner device and/or without providing the actual biometric data to the scanning device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with controlling access to secure information, spaces, and the like.

In some examples, biometric data for a plurality of users may be received. The biometric data may be received with registration data including user identifiers, user device identifiers, and the like. A computing platform may receive a request to process an event. In some examples, the request to process the event may include a request to access a secure area or building, a request to access an account, or the like. In response to receiving the request to process the event, the computing platform may retrieve biometric data of a requesting user and generate, based on the biometric data, a hologram of the biometric data of the user.

In some examples, the hologram may be displayed on a device and provided to an authentication reader device as authentication data. The authentication reader device may capture an image of the hologram and the computing platform may receive the image. The computing platform may compare the captured image of the hologram to the generated hologram to determine whether there is a match. If not, the requested event may be denied. If so, the event may be processed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, controlling access to secure locations, sensitive information, and the like is a top priority for enterprise organizations. As more systems begin to rely on biometric data to authenticate a user and provide access, unauthorized actors have developed ways to skim biometric data from scanners or other authentication reader devices. Accordingly, aspects described herein are directed to generating a hologram of user biometric data to provide to the authentication reader device without contacting the device or providing actual biometric data of the user.

In some arrangements, a request to process an event may be received. In response, user biometric data may be retrieved and a hologram of the user biometric data may be generated. In some examples, the hologram may include a digital watermark or other embed that may be dynamically generated and the location of which within the hologram may vary.

In some examples, the authentication reader device may capture an image of the hologram and a computing platform may compare the captured image of the hologram to the generated hologram to determine whether a match exists. If not, the request to process the event may be denied. If so, the event may be processed.

These and various other arrangements will be discussed more fully below.

Figure 1A:
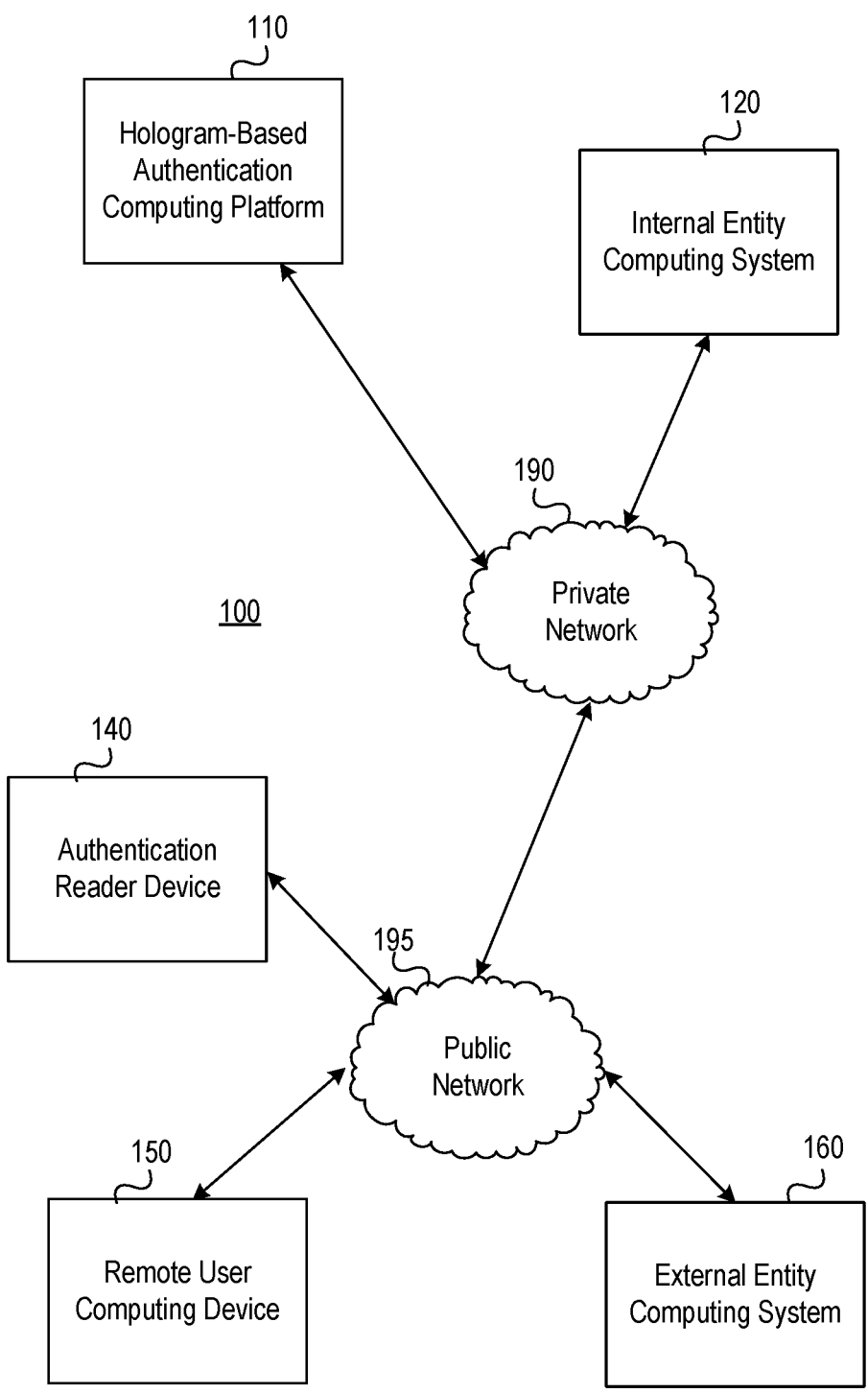
FIGS. 1A-1B depict an illustrative computing environment for biometric data-based holographic authentication in accordance with one or more aspects described herein.
Figure 1B:
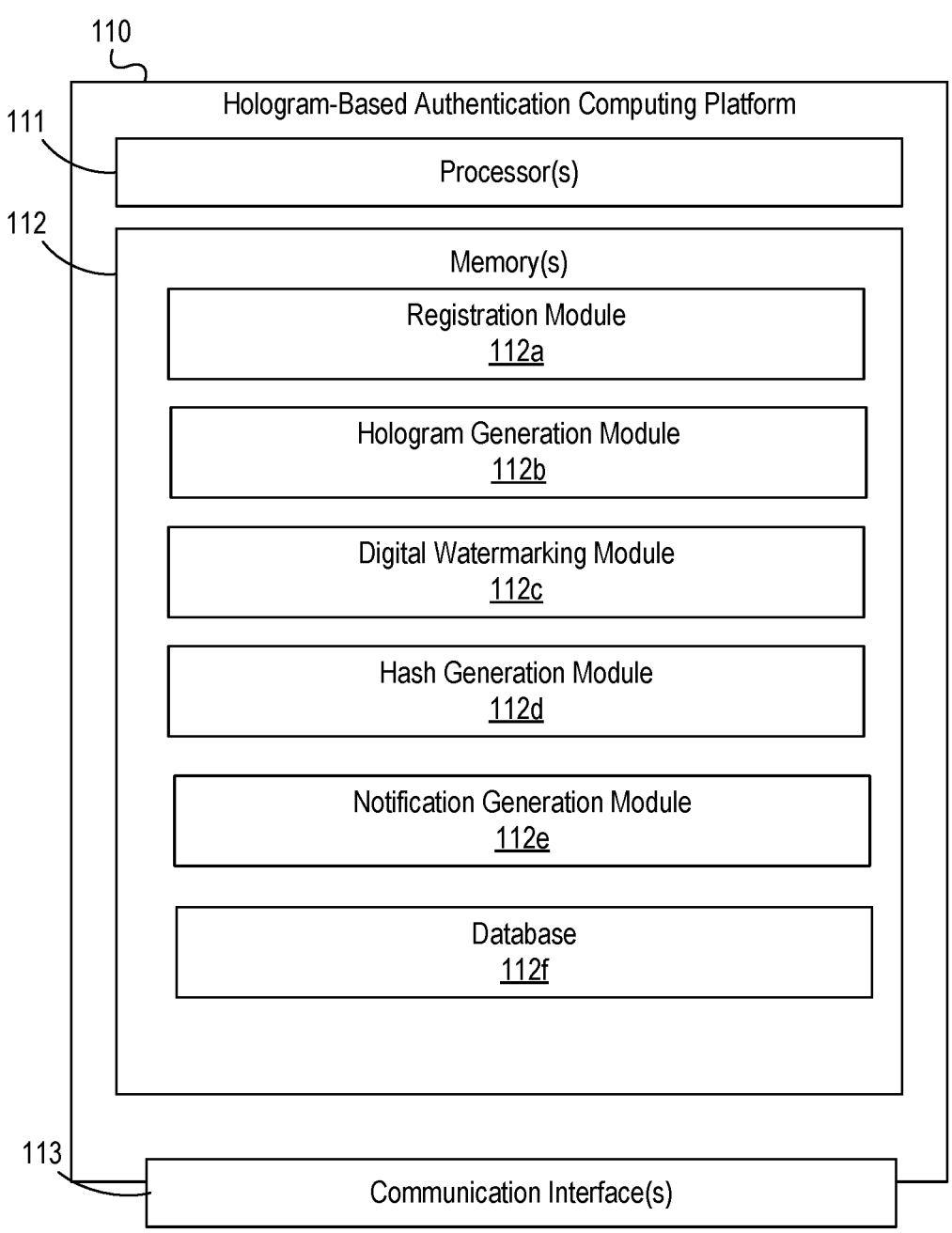

FIGS. 1A-1B depict an illustrative computing environment for implementing biometric data-based holographic authentication in accordance with one or more aspects described herein. Referring to FIG. 1A, computing environment 100 may include one or more computing devices and/or other computing systems. For example, computing environment 100 may include hologram-based authentication computing platform 110, internal entity computing system 120, authentication reader device 140, remote user computing device 150 and external entity computing system 160. Although one internal entity computing system 120, one authentication reader device 140, one remote user computing device 150, and one external entity computing system 160 are shown, more or fewer devices or systems may be used without departing from the invention. Further, while hologram-based authentication computing platform 110 is shown as a separate device, in some examples, hologram-based authentication computing platform may be part of a same device as one or more other devices or systems, such as remote user computing device 150, internal entity computing system 120, or the like.

Hologram-based authentication computing platform 110 may be or include one or more computing devices (e.g., servers, server blades, or the like) and/or one or more computing components (e.g., memory, processor, and the like) and may be configured to provide dynamic, efficient hologram-based authentication. For instance, hologram-based authentication computing platform 110 may receive registration data of one or more users. The registration data may include a request for holographic authentication and may include biometric data of the one or more users, such as fingerprints, facial scans, iris scans, physiological data captured by one or more sensors of a user computing device, or the like. The hologram-based authentication computing platform 110 may store the received registration data.

In some examples, hologram-based authentication computing platform 110 may receive a request to process an event. In some examples, the request to process the event may include a request to access a secure building or location, a request to process a transaction, a request to access a secure account or other secure data, or the like. The request to process the event may be received from internal devices, (e.g., devices associated with an enterprise organization associated with the hologram-based authentication computing platform 110 such as internal entity computing system 120) and/or external devices, (e.g., devices external to the enterprise organization, such as external entity computing system 160).

In response to receiving the request to process the event, hologram-based authentication computing platform 110 may generate a hologram of the biometric data provided by the user. For instance, biometric data of a user requesting to process the event may be retrieved and a hologram generated of the biometric data. In some examples, a digital watermark or other embed may be generated and included in the generated hologram. In some examples, a cryptographic hash of the hologram (and, in some examples, digital watermark) may be generated.

The hologram-based authentication computing platform 110 may transmit the generated hologram to a user device, such as remote user computing device 150. In some examples, transmitting the hologram may include sending a digital representation, an audio representation, or the like. In some examples, transmitting the generated hologram may cause the remote user computing device 150 to display the hologram. A user may then present the displayed hologram to an authentication reader device, (e.g., scanner, or the like). In some examples, the hologram may be presented to the authentication reader device 140 without contacting a surface of the authentication reader device 140 (e.g., the displayed hologram may be held above the surface of the authentication reader device 140). The authentication reader device 140 may capture an image of the hologram and may transmit the captured image of the hologram-based authentication computing platform 110.

The hologram-based authentication computing platform 110 may receive the captured image and may compare it to the generated hologram. In some examples, a cryptographic hash of the captured image of the hologram may be generated and compared to the hash of the generated hologram. If a match occurs, the user may be authenticated and the requested event processed. If not, the request to process the event may be denied.

Internal entity computing system 120 may be or include one or more computing devices (e.g., servers, server blades, or the like) and/or one or more computing components (e.g., memory, processor, and the like) and may be configured to receive, from a user or user device, a request to process an event. The event may include a request to access a location or building, process a transaction, access an account, or the like. For instance, the internal entity computing system 120 may receive a request to process a transaction from a remote user computing device 150, from a point-of-sale system at a merchant location, or the like. In some examples, internal entity computing system 120 may host or execute one or more applications used by the enterprise organization to control access to systems, accounts, or the like, process transactions, or the like.

Authentication reader device 140 may be or include a computing device configured to scan a user to capture biometric data (e.g., a fingerprint scanner, a facial recognition scanner, iris scanner, or the like). In some examples, the authentication reader device 140 may be configured to capture an image (e.g., an image of a hologram displayed on a user computing device). A plurality of authentication reader devices may be distributed at various locations (e.g., adjacent a secure building or location, at merchant sites, at computing devices used to access accounts or process transactions, or the like).

Remote user computing device 150 may be or include computing devices such as desktop computers, laptop computers, tablets, smartphones, wearable devices, and the like, that may be associated with a user or customer (e.g., a customer of the enterprise organization, an employee of the enterprise organization, or the like). In some examples, remote user computing device 150 may be a personal computing device of a user who is an employee of the enterprise organization (e.g., an employee's smart phone or personal laptop). Remote user computing device 150 may execute an application (e.g., an application associated with the enterprise organization such as a mobile banking application, or other application) that may be used to display holographic images, receive and display authentication notifications, and the like.

External entity computing system 160 may be or include one or more computing devices (e.g., servers, server blades, or the like) and/or one or more computing components (e.g., memory, processor, and the like) and may be configured to receive, from a user or user device, a request to process an event. The event may include a request to access a location or building, process a transaction, access an account, or the like. For instance, the external entity computing system 160 may receive a request to process a transaction from a remote user computing device 150, from a point-of-sale system at a merchant location, or the like. In some examples, external entity computing system 160 may host or execute one or more applications used by an entity external to the enterprise organization (e.g., a transaction processing entity, an entity hosting one or more user accounts, or the like) to control access to systems, accounts, or the like, process transactions, or the like.

As mentioned above, computing environment 100 also may include one or more networks, which may interconnect one or more of hologram-based authentication computing platform 110, internal entity computing system 120, authentication reader device 140, remote user computing device 150 and/or external entity computing system 160. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, hologram-based authentication computing platform 110 and/or internal entity computing system 120, may be associated with an enterprise organization (e.g., a financial institution), and private network 190 may be associated with and/or operated by the organization, and may include one or more networks (e.g., LANs, WANs, virtual private networks (VPNs), or the like) that interconnect hologram-based authentication computing platform 110 and/or internal entity computing system 120, and one or more other computing devices and/or computer systems that are used by, operated by, and/or otherwise associated with the organization. Public network 195 may connect private network 190 and/or one or more computing devices connected thereto (e.g., hologram-based authentication computing platform 110, internal entity computing system 120) with one or more networks and/or computing devices that are not associated with the organization. For example, authentication reader device 140, remote user computing device 150 and/or external entity computing system 160 might not be associated with an organization that operates private network 190 (e.g., because authentication reader device 140, remote user computing device 150 and/or external entity computing system 160 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect authentication reader device 140, remote user computing device 150 and/or external entity computing system 160 to private network 190 and/or one or more computing devices connected thereto (e.g., hologram-based authentication computing platform 110, internal entity computing system 120). Although authentication reader device 140 is shown as external to the enterprise organization and connected via public network 195, in some examples, one or more authentication reader devices 140 may be internal to the enterprise organization and connected via private network 190.

Referring to FIG. 1B, hologram-based authentication computing platform 110 may include one or more processors 111, memory 112, and communication interface 113. A data bus may interconnect processor(s) 111, memory 112, and communication interface 113. Communication interface 113 may be a network interface configured to support communication between hologram-based authentication computing platform 110 and one or more networks (e.g., network 190, network 195, or the like). Memory 112 may include one or more program modules having instructions that when executed by processor(s) 111 cause hologram-based authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of hologram-based authentication computing platform 110 and/or by different computing devices that may form and/or otherwise make up hologram-based authentication computing platform 110.

For example, memory 112 may have, store and/or include registration module 112a. Registration module 112a may store instructions and/or data that may cause or enable the hologram-based authentication computing platform 110 to receive, from one or more users, registration data. In some examples, the registration data may include biometric data of each user (e.g., fingerprint, iris scan, facial scan, physiological data captured via one or more sensors in a user computing device, or the like). In some arrangements, the registration data may include user device identifying data (e.g., for transmitting generated holograms for display). The registration may include one or more computing devices for a user (e.g., a smartphone and a wearable device, or the like).

Hologram-based authentication computing platform 110 may further have, store and/or include hologram generation module 112b. Hologram generation module 112b may store instructions and/or data that may cause or enable the hologram-based authentication computing platform 110 to generate a hologram based on the biometric data of a user (e.g., received during a registration process). For instance, hologram generation module 112b may create a computer-generated hologram by modeling wavefronts and digitally combining the wavefronts to generate the hologram. The hologram may also be generated using other techniques, such as superimposing a reference beam on a wavefront of interest to create an interference pattern that may be recorded. Various methods of generating a hologram may be used without departing from the invention.

The hologram generation module 112b may retrieve biometric data associated with a user requesting to process an event and may generate a hologram of the biometric data. Hologram generation module 112b may then transmit or send the generated hologram to a user device, such as remote user computing device 150, which may cause the remote user computing device 150 to display the hologram. In some examples, a hologram may be generated for single user (e.g., one time authentication and then the hologram may be deleted). Additionally or alternatively, a hologram may be generated for use during a predetermined time period (e.g., one day, one week, one month, or the like) and deleted upon expiration of the time period.

Hologram generation module 112b may also store instructions and/or data that may cause or enable the hologram-based authentication computing platform 110 to receive an image of a hologram (e.g., from authentication reader device 140) and compare the received hologram to the generated hologram to approve or deny the request to process the event.

In some examples, prior to generating or transmitting the hologram, a digital watermark or other embed may be generated and embedded in the hologram. For instance, hologram-based authentication computing platform 110 may further have, store and/or include digital watermarking module 112c. Digital watermarking module 112c may store instructions and/or data that may cause or enable the hologram-based authentication computing platform 110 to generate a digital watermark or other embed and embed the watermark in a hologram generated based on user biometric data. In some examples, a different watermark may be generated and embedded each time a hologram is generated (e.g., for each request to process an event, for a particular time period, or the like). Additionally or alternatively, the watermark may be embedded in a different location in the hologram each time a hologram is generated.

Hologram-based authentication computing platform 110 may further have, store and/or include hash generation module 112d. Hash generation module 112d may store instructions and/or data that may cause or enable the hologram-based authentication computing platform 110 to generate a cryptographic hash of a generated hologram (and, in some examples, embedded watermark). In some examples, hash generation module 112d may be configured to generate a cryptographic hash of a captured image of a hologram (e.g., received from, for instance, authentication reader device 140) and compare the hash of the generated hologram to the hash based on the captured image of the hologram. If a match exists, the user may be authenticated and the event processed. If not, the event processing request may be denied.

Hologram-based authentication computing platform 110 may further have, store and/or include notification generation module 112e. Notification generation module 112e may store instructions and/or data that may cause or enable the hologram-based authentication computing platform 110 to generate an authentication notification based on comparing a generated hologram to a received hologram, comparing hashes, or the like. For instance, a notification indicating a match and include an authorization to process the requested event may be generated if a match exists and transmitted to one or more devices. Alternatively, if no match exists, a notification denying the request to process the event may be generated and transmitted to the one or more devices.

Hologram-based authentication computing platform 110 may further have, store and/or include a database 112f. Database 112f may store data associated with user registration, generated holograms and watermarks, generated hashes, and/or other data that enables performance of the aspects described herein by the hologram-based authentication computing platform 110.

FIGS. 2A-2E depict one example illustrative event sequence for implementing biometric data-based holographic authentication in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
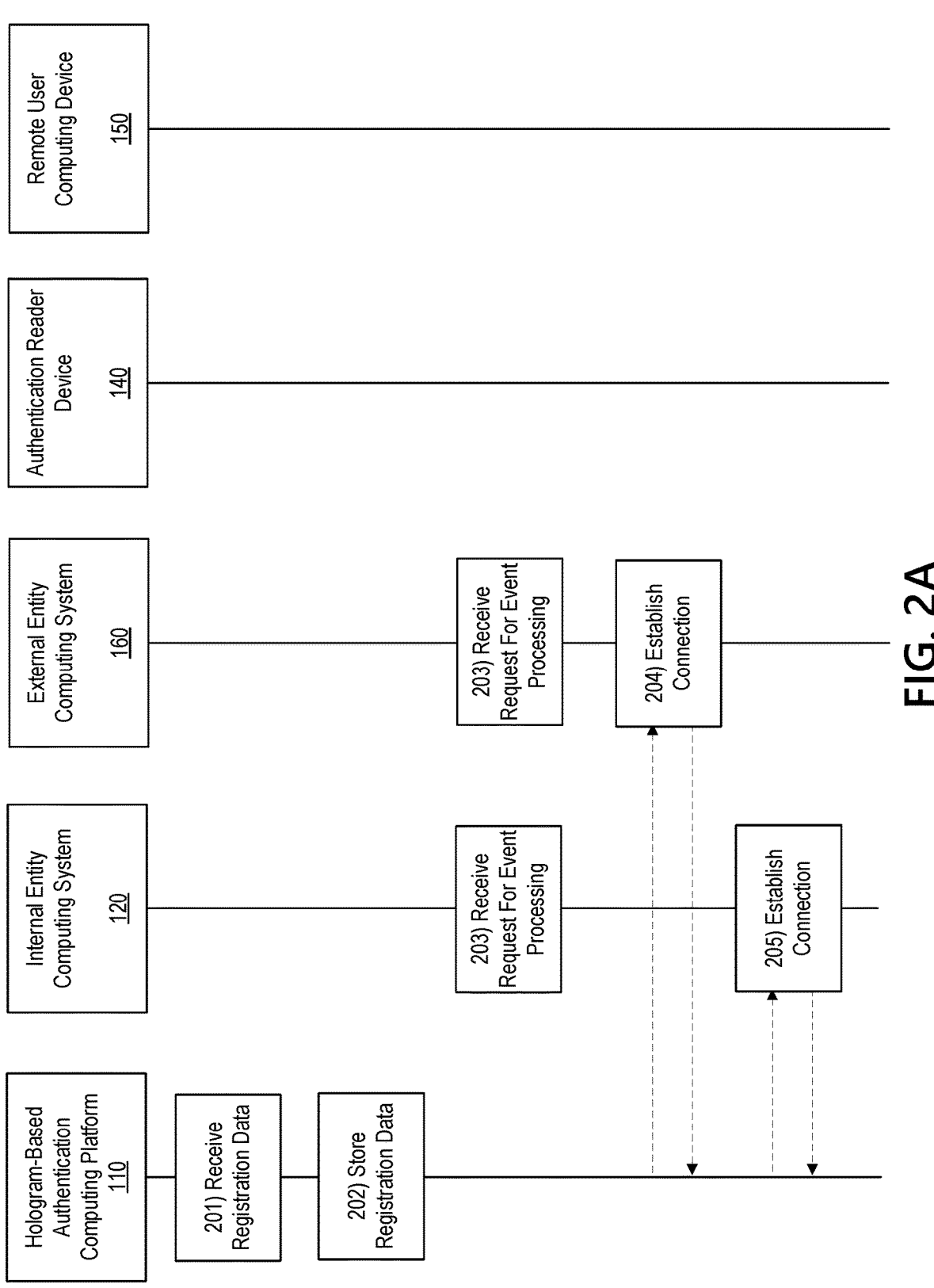
FIGS. 2A-2E depict an illustrative event sequence for biometric data-based holographic authentication in accordance with one or more aspects described herein.

With reference to FIG. 2A, at step 201, hologram-based authentication computing platform 110 may receive registration data. In some examples, the registration data may be received from a plurality of users requesting to register for hologram-based authentication. The registration data may include user identifying data, user contact data, biometric data of the user, device identifying data of one or more devices associated with the user, and the like.

At step 202, hologram-based authentication computing platform 110 may store the received registration data. For instance, a database, such as database 112f may be modified to include new data entries associated with each registered user.

At step 203, a request for event processing may be received by an internal device or an external device. For instance, a request for event processing may be received by internal entity computing system 120 and/or external entity computing system 160. The request for event processing may be received from a user device (e.g., remote user computing device 150), a merchant point-of-sale system, a website, or the like. The request for event processing may include a request to access a location or building, a request to access an account, a request to process a payment or other transaction, or the like. Although FIG. 2A includes a request for event processing being received by each of internal entity computing system 120 and external entity computing system 160, in some examples, the request may be received by one or the other of internal entity computing system 120 or external entity computing system 160.

At step 204, external entity computing system 160 may establish a connection with the hologram-based authentication computing platform 110. For instance, a first wireless connection may be established between the external entity computing system 160 and the hologram-based authentication computing platform 110. Upon establishing the first wireless connection, a communication session may be initiated between the external entity computing system 160 and the hologram-based authentication computing platform 110.

At step 205, internal entity computing system 120 may establish a connection with the hologram-based authentication computing platform 110. For instance, a second wireless connection may be established between the internal entity computing system 120 and hologram-based authentication computing platform 110. Upon establishing the second wireless connection, a communication session may be initiated between the internal entity computing system 120 and the hologram-based authentication computing platform 110.

Although FIG. 2A includes establishing connections between each of internal entity computing system 120 and external entity computing system 160 with the hologram-based authentication computing platform 110, in some examples, only the system receiving the request to process the event at may initiate the connection with the hologram-based authentication computing platform 110.

Figure 2B:
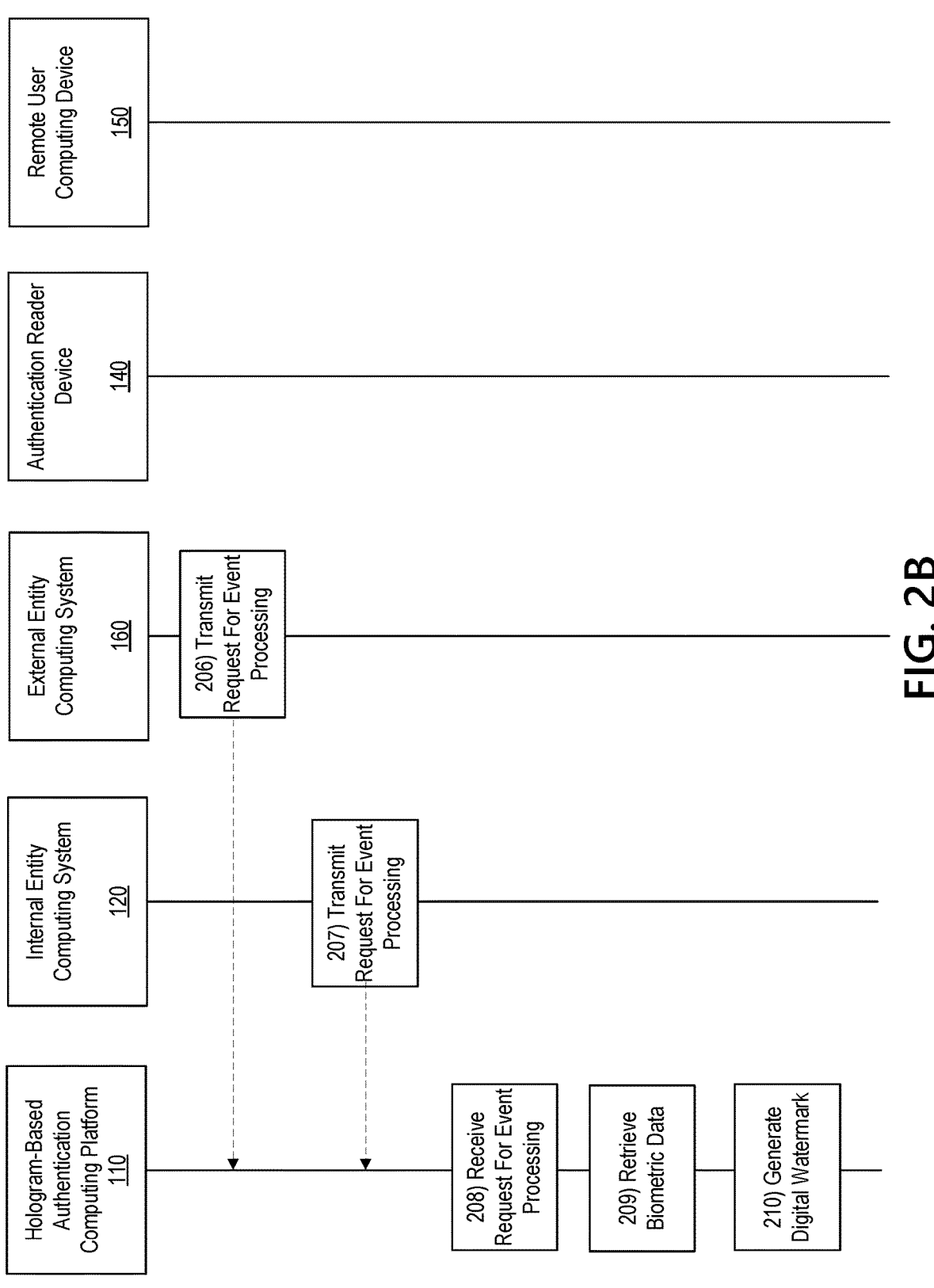

With reference to FIG. 2B, at step 206, if the request for event processing was received by the external entity computing system 160, then external entity computing system 160 may transmit or send the request for event processing. For instance, the request for event processing may be transmitted or sent during the communication session initiated upon establishing the first wireless connection.

At step 207, if the request for event processing was received by the internal entity computing system 120, then internal entity computing system 120 may transmit or send the request for event processing. For instance, the request for event processing may be transmitted or sent during the communication session initiated upon establishing the second wireless connection.

At step 208, the hologram-based authentication computing platform 110 may receive, from one or more of internal entity computing system 120 and/or external entity computing system 160, the request for event processing.

In response to receiving the request for event processing, the hologram-based authentication computing platform 110 may retrieve biometric data associated with a user requesting event processing at step 209. For instance, user identifying data may be extracted from the event processing request and used to retrieve biometric data associated with the user (e.g., received during a registration process).

At step 210, in some examples, a digital watermark or other embed may be generated by the hologram-based authentication computing platform 110. For instance, in some examples, additional security for the authentication process may be desired or required. Accordingly, a digital watermark or other embed may be generated for use with a hologram. The digital watermark may change or be dynamically generated with each event processing request, after a predetermined time period, or the like. In examples in which a digital watermark is not being used in authentication for the requested event processing, step 210 may be omitted.

Figure 2C:
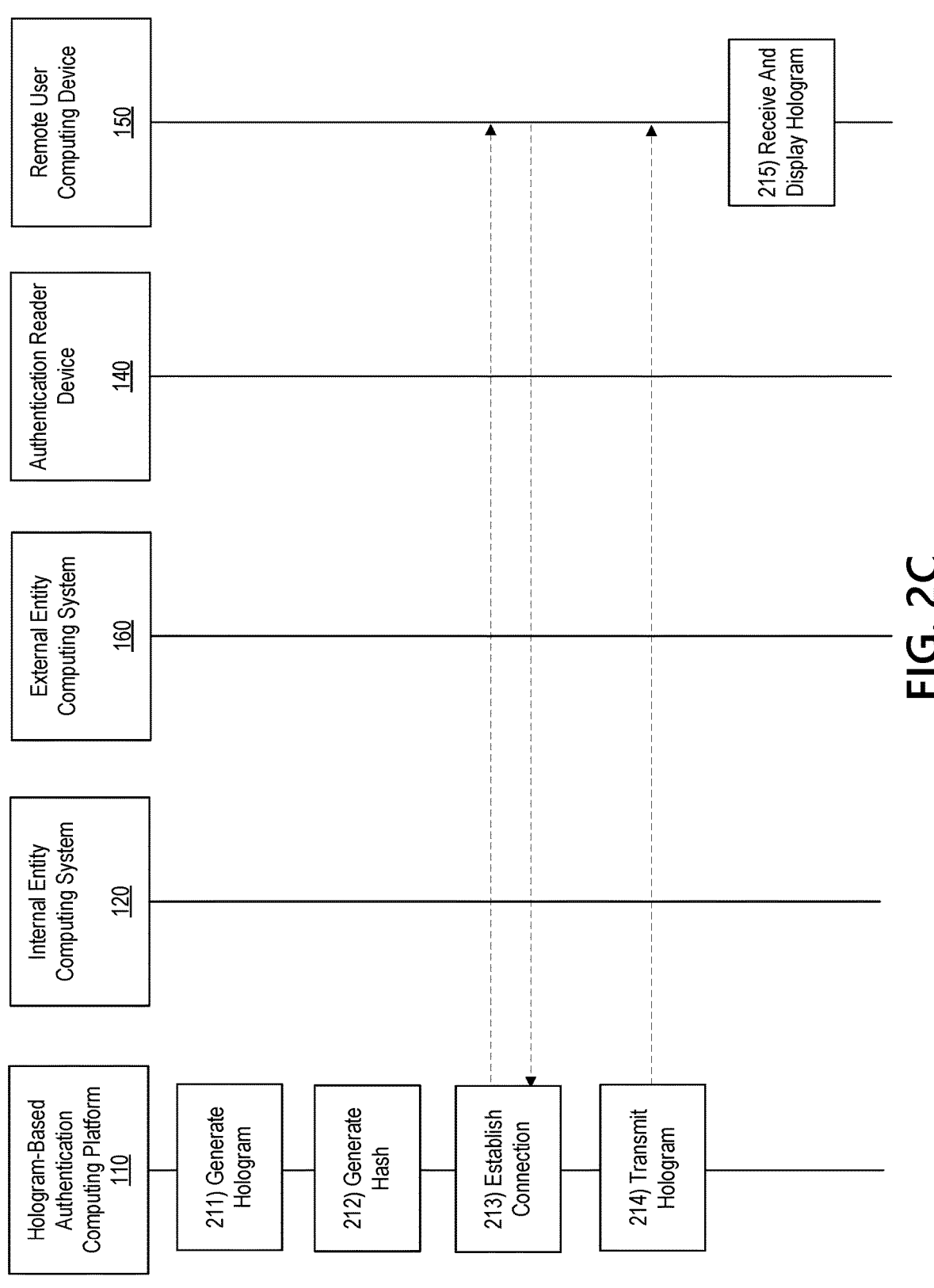

With reference to FIG. 2C, at step 211, the hologram-based authentication computing platform 110 may generate a hologram based on the retrieved biometric data (or portion thereof) and, in some examples, the generated digital watermark. For instance, hologram-based authentication computing platform 110 may generate a hologram of the retrieved biometric data (e.g., fingerprint, facial scan, or the like) and, in some examples, may embed the generated digital watermark in the hologram. In examples in which a digital watermark is used, a position or location of the watermark may be dynamically determined and may vary with each generation of a hologram, after expiration of a predetermined time period, or the like.

At step 212, in some examples, (e.g., in arrangements in which additional security is requested or required) a cryptographic hash of the hologram (and, in some examples, digital watermark) may be generated. For instance, a cryptographic hash of the hologram and any embedded digital watermark may be generated and stored. In some examples, an additional, one-time, dynamically generated passcode may be appended to the cryptographic hash and sent, with a hologram, to a user device for authentication use. In examples in which a cryptographic hash is not requested or required, step 212 may be omitted.

At step 213, hologram-based authentication computing platform 110 may establish a connection with the remote user computing device 155 (e.g., a user device associated with the user requesting event processing). For instance, a third wireless connection may be established between the hologram-based authentication computing platform 110 and the remote user computing device 155. Upon establishing the third wireless connection, a communication session may be initiated between the hologram-based authentication computing platform 110 and the remote user computing device.

At step 214, the hologram-based authentication computing platform 110 may transmit or send the generated hologram (and any embedded digital watermark) to the remote user computing device 155. For instance, the hologram-based authentication computing platform 110 may send the hologram during the communication session initiated upon establishing the third wireless connection.

At step 215, remote user computing device may receive and display the hologram. For instance, transmitting or sending the hologram by the hologram-based authentication computing platform 110 may cause the remote user computing device 155 to display the hologram on a display of the remote user computing device 155.

As mentioned above, in some examples, hologram-based authentication computing platform 110 may be part of the remote user computing device 155 and the hologram may be generated by an application executing on the remote user computing device 155.

Figure 2D:
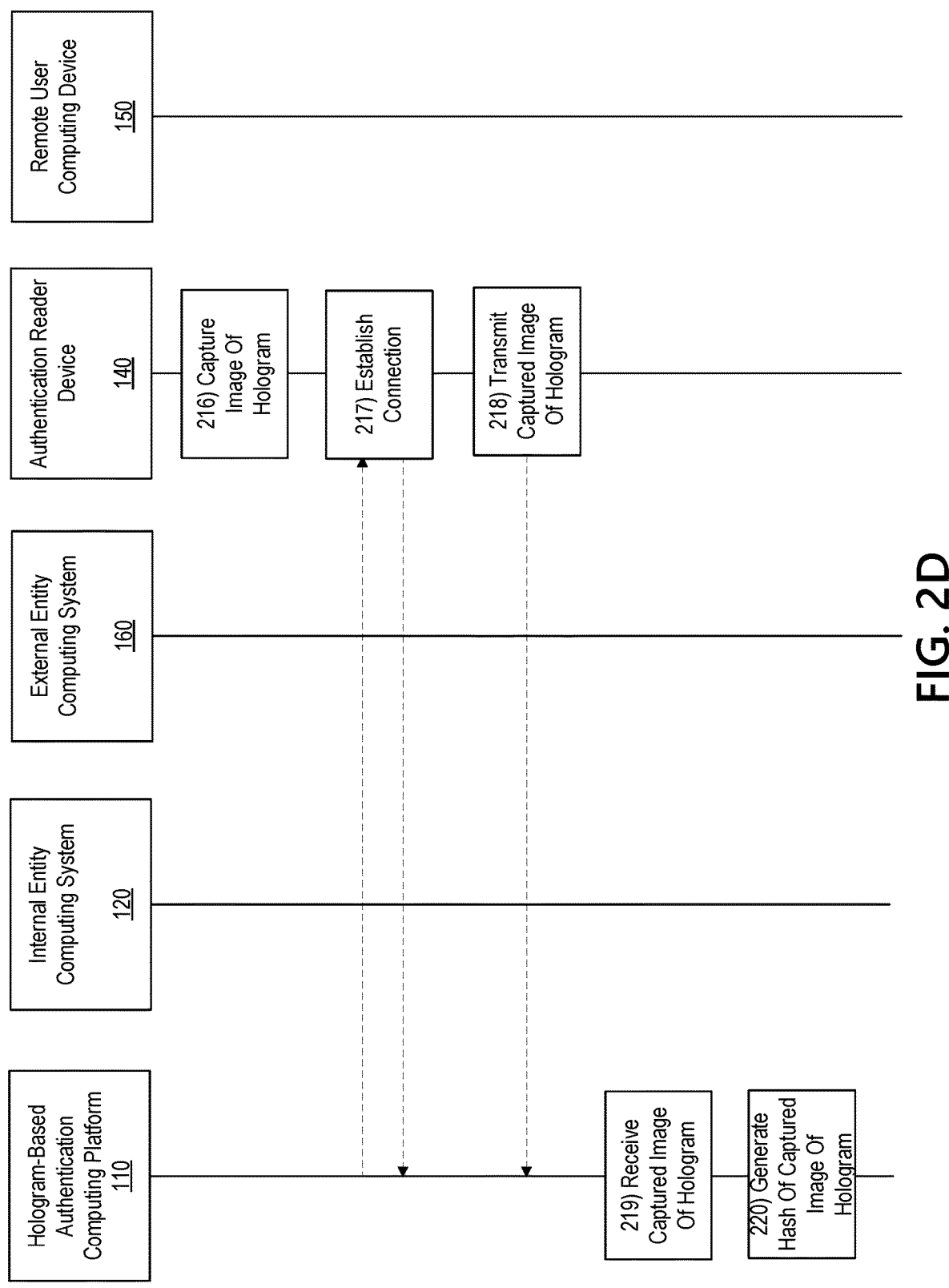

With reference to FIG. 2D, at step 216, the authentication reader device 140 may capture an image of the hologram from the display of the remote user computing device 155. For instance, a user may hold the remote user computing device 155 display over the authentication reader device 140 (e.g., hover over the authentication reader device 140) in response to a request for biometric data to authenticate the user (e.g., to process the event). Instead of providing biometric data directly to the authentication reader device 140, the hologram may be presented to the authentication reader device 140 and the authentication reader device 140 may capture an image of the hologram (and any embedded watermarks).

At step 217, authentication reader device 140 may establish a connection with the hologram-based authentication computing platform 110. For instance, a fourth wireless connection may be established between the authentication reader device 140 and the hologram-based authentication computing platform 110. Upon establishing the fourth wireless connection, a communication session may be initiated between the authentication reader device 140 and the hologram-based authentication computing platform 110.

At step 218, authentication reader device 140 may transmit or send the captured image of the hologram (and, in some examples, digital watermark) to the hologram-based authentication computing platform 110. For instance, the authentication reader device 140 may transmit or send the captured image of the hologram during the communication session initiated upon establish the fourth wireless connection.

At step 219, the hologram-based authentication computing platform 110 may receive the captured image of the hologram sent at step 218.

At step 220, in some examples, a cryptographic hash of the captured image of the hologram may be generated. For instance, a cryptographic hash of the captured image of the hologram (and any embedded digital watermarks) may be generated by the hologram-based authentication computing platform 110. In arrangements in which a hash function is not used, step 220 may be omitted.

Figure 2E:
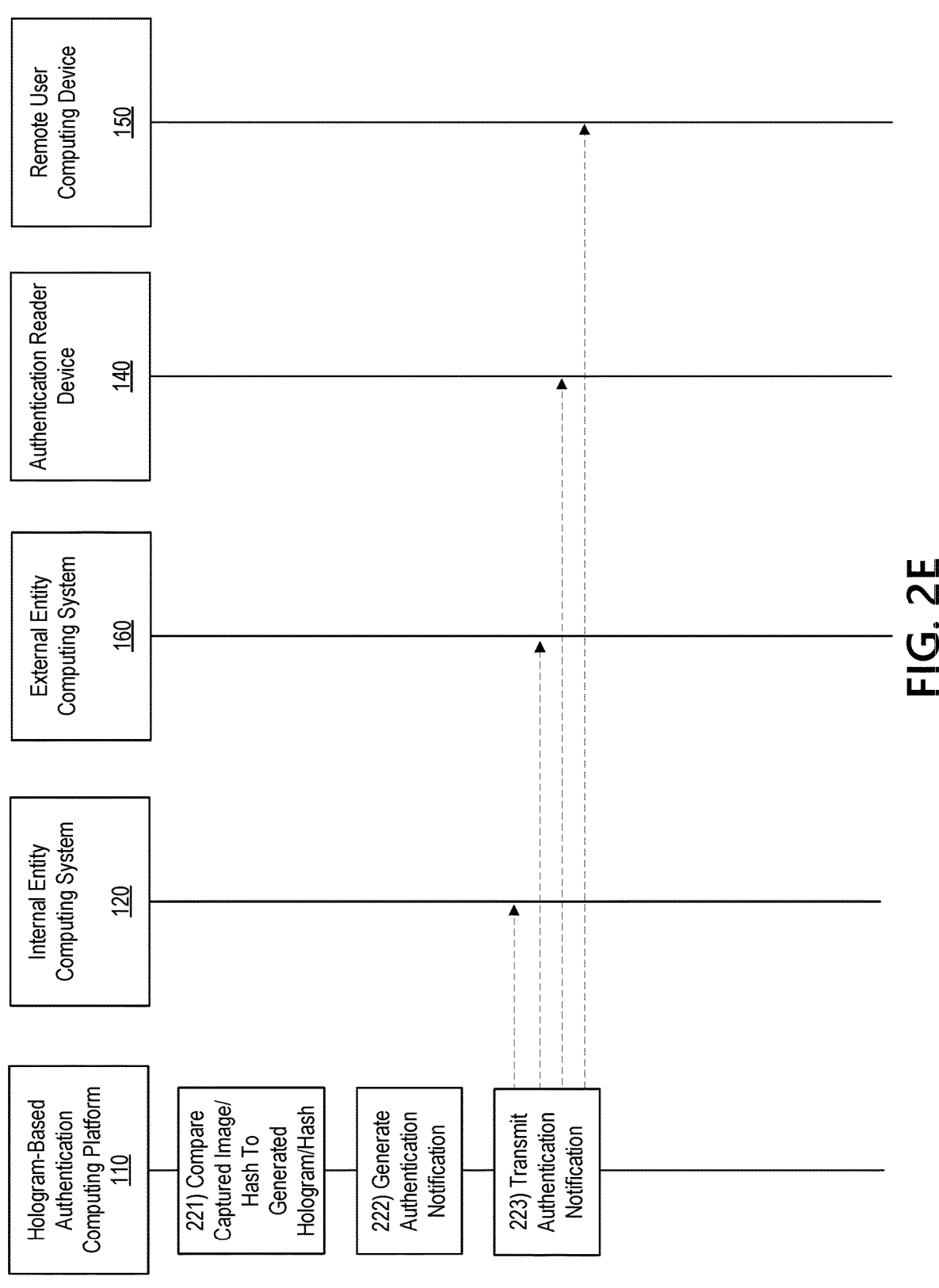

With reference to FIG. 2E, at step 221, hologram-based authentication computing platform 110 may compare the received captured image of the hologram to the generated hologram and/or the hash of the captured image of the hologram to the hash of the generated hologram, to determine whether the user is authenticated and the event should be processed. If a match exists, the user may be authenticated and the requested event processed. If a match does not exist, the requested event may be denied. In some examples, the match may be a complete match. In other examples, at least a threshold percentage of the captured hologram must match the generated hologram in order to be considered a match. In some examples, matching the captured hologram to the generated hologram may include matching a digital watermark, a position of a digital watermark, and the like. In some examples, matching the cryptographic hashes may include matching a one-time passcode appended to the hologram and included in the cryptographic hashes.

Figure 4:
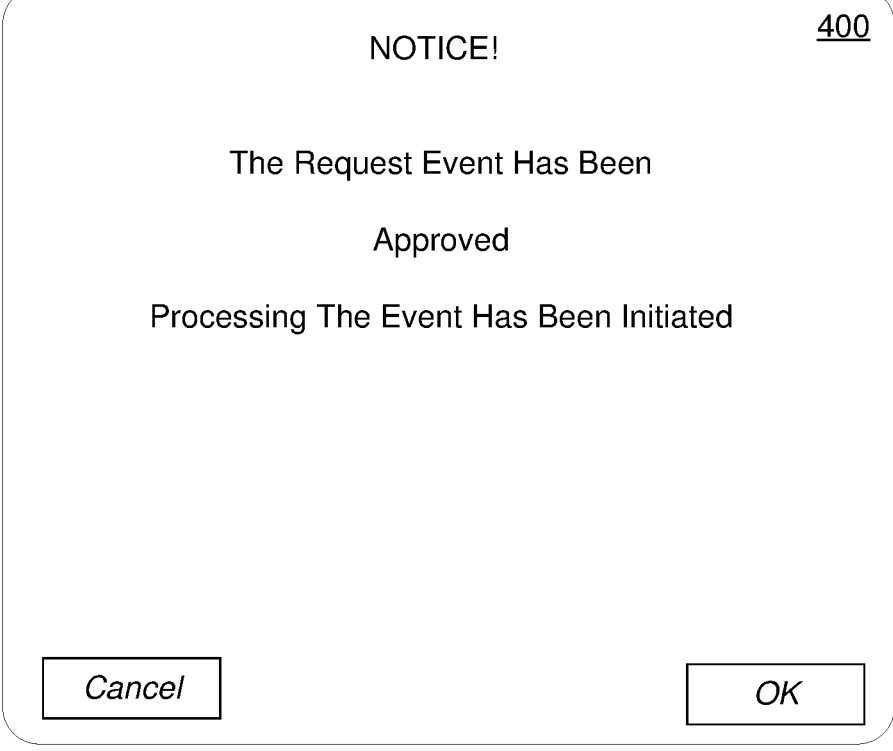
FIG. 4 illustrates an example graphical user interface that may be generated in accordance with one or more aspects described herein.

At step 222, based on the comparing the captured hologram to the generated holograph and/or the hash of the generated hologram to the hash of the captured hologram, the hologram-based authentication computing platform 110 may generate an authentication notification. In some examples, the authentication notification may include an indication of whether the user is authenticated, whether the request to process the event is approved, or the like. For instance, FIG. 4 includes a user interface 400 indicating that a request to process an event has been approved and indicating that the event processing has been initiated. Other user interfaces, such as those indicating denial of the requested event, may be used without departing from the invention.

At step 223, hologram-based authentication computing platform 110 may transmit or send the generated authentication notification to one or more computing devices or systems. For instance, hologram-based authentication computing platform 110 may transmit or send the authentication notification to a system from which the request to process the event was received (e.g., internal entity computing system 120, external entity computing system 160, or the like), to the authentication reader device 140 that captured the hologram image (e.g., to allow/deny access), to remote user computing device 150 (e.g., to inform the user of the authentication result), and the like. In some examples, transmitting or sending the authentication notification may cause the authentication notification to be displayed on a display of a receiving system or device, may cause initiation of event processing functions, may execute an instruction to prevent event processing (e.g., prevent access to an account, prevent access to a location, or the like), and the like.

Figure 3:
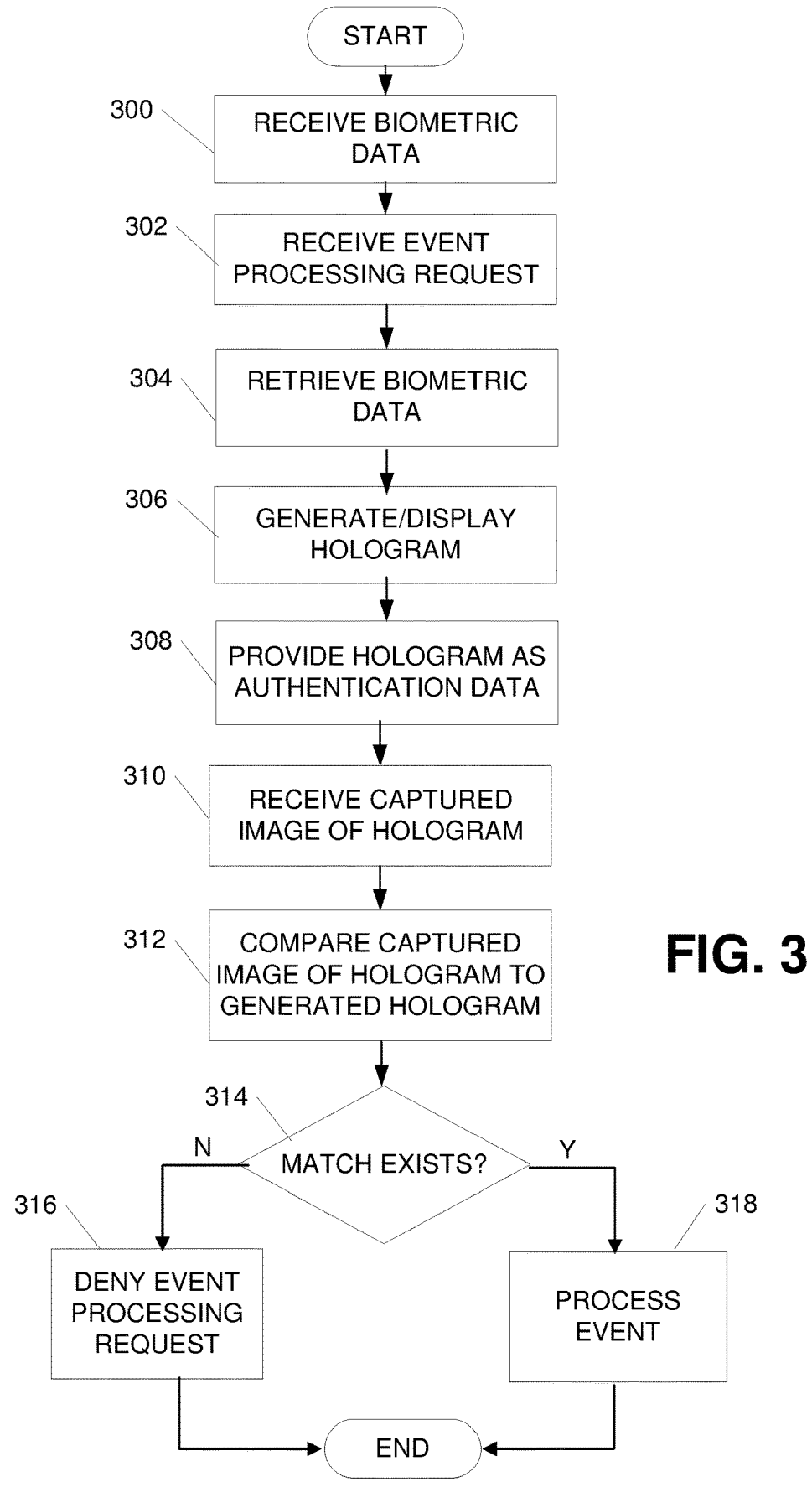
FIG. 3 depicts an illustrative method for biometric data-based holographic authentication in accordance with one or more aspects described herein.

FIG. 3 is a flow chart illustrating one example method of biometric-based holographic authentication in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform may receive biometric data from a plurality of users. The biometric data may include fingerprints, facial scans, and the like. In some examples, the biometric data may be received during a registration process which may include receiving additional data including user identifying data, user device identifying data, and the like.

At step 302, the computing platform may receive a request to process an event. In some examples, the request to process an event may include a request to access a secure location or area, a request to process a transaction, a request to access an account, or the like. The request to process the event may be initiated by a user and may be received via an internal device or system, such as internal entity computing system 120, or an external device or system, such as external entity computing device 160.

At step 304, based on the received request to process the event, biometric data associated with the user requesting event processing may be retrieved.

At step 306, the computing platform may generate a hologram based on the retrieved biometric data. For instance, biometric data or a portion thereof may be used to generate a hologram of the biometric data that may be used as authentication data (e.g., provided in lieu of providing actual physical biometric data). In some examples, generating the hologram may include generating a digital watermark and embedding the digital watermark in the hologram. In some examples, the digital watermark (and/or hologram) may be dynamically generated for one-time use. Additionally or alternatively, a location or position of the digital watermark within the hologram may vary. In some examples, generating the hologram (and/or digital watermark) may cause the hologram to display on a display of a device.

At step 308, the generated hologram may be provided to an authentication reader device as authentication data. For instance, the hologram may be held over the authentication reader device to allow the authentication reader device to read the hologram as authentication data and capture an image of the hologram.

At step 310, the captured image of the hologram may be received by the computing platform. At step 312, the captured image of the generated hologram may be compared to the generated hologram to determine whether a match exists. In some examples, determining whether a match exists may include determining whether a watermark matches an expected watermark, expected location of a watermark, or the like.

At step 314, a determination may be made as to whether a match exists. If a match between the captured image of the generated hologram and the hologram does not exists, the request for event processing may be denied at step 316. If a match does exist, the requested event may be processed at step 318.

As discussed herein, aspects described include generating a holographic image of biometric data of a user to provide as authentication data in lieu or providing actual biometric data to a scanning device. The hologram may be provided to the scanning device without physically contacting the scanning device, a surface of the device, or the like. For instance, a user may hold a mobile device displaying the hologram over the scanning device and the scanning device may capture an image of the hologram for authentication. As discussed herein, biometric data may include fingerprint, hand print, portion of a hand print or fingerprint, facial scan, portion of a facial scan, or the like.

As discussed herein, the holograms may be dynamically generated (e.g., in response to a request for event processing) and may be generated for one-time use, for use during a predetermined time period (e.g., one day, one week, or the like) and the like. In some examples, after one-time use or after expiration of the predetermined time period, the generated hologram may be automatically deleted. Additionally or alternatively, a hologram may be generated for a predetermined time or one-time use automatically (e.g., without a request for event processing) and may be held until requesting for authentication use or until expiration.

As also discussed above, the digital watermark or embed may be dynamically generated for each hologram generated, for each use of a hologram, or the like. In some examples, the watermarks may vary with each hologram, each generation, or the like. In some examples, a position or location of the watermark or other embed within the hologram may vary each time a hologram is generated, or the like. Accordingly, even if an unauthorized user obtained biometric data of a user, or attempted to duplicate a hologram of the user biometric data, the biometric data or the duplicated hologram would not include the expected watermark or expected watermark location, and the unauthorized user would not be authenticated. Accordingly, a watermark or watermark location may be generated or determined for a particular transaction, for the predetermined time associated with the hologram, or the like. This may generate moving data points that may be difficult or impossible to duplicate by unauthorized users.

Further, while biometric data may change for a user (e.g., fingerprints change, facial scan may change, or the like), the use of holograms may enable continued authentication that either includes those changes or does not include those changes, while maintaining security. For instance, a user might provide initial biometric data via fingerprint and a fingerprint may change. Accordingly, in conventional systems, the changed fingerprint might not match the original fingerprint which may lead to a legitimate user not being authenticated. However, arrangements described herein may continue to generate holograms based on the original fingerprint and, accordingly, the user may continue to be authenticated.

In another example, a user may update biometric data to the hologram-based authentication computing platform with any changes. Accordingly, newly generated holograms may include the modified fingerprint and, accordingly, the user may continue to be authenticated.

In some examples, one or more of the hologram, digital watermark, and/or cryptographic hash may be used alone or in combination to provide authentication. For instance, in some examples, the hologram alone may be sufficient to authenticate a user (e.g., at a first level of authentication, for low dollar value transactions, to gain access to a standard office building, or the like). In some examples, a second, higher level of authentication may be required and, accordingly, the hologram with watermark may be used, or a hash of the hologram (e.g., without a watermark may be used) to authenticate at that level (e.g., higher dollar value transactions, access to secure locations with very limited access, or the like). In still other examples, at a third level of authentication (e.g., most secure access, highest dollar value transactions, or the like), the hologram may be generated with a digital watermark and a cryptographic hash may be generated. The three levels described are merely some examples, and other or additional combinations, levels, or the like, may be used without departing from the invention.

Although aspects described herein include an authentication reader device capturing image of hologram, the image might not be stored or captured by the reader and, in some examples, the image might be conveyed to the computing platform via a connection with the reader and without capturing an image of the hologram.

Aspects described herein are directed to using a mobile device of a user to display the hologram. Additionally or alternatively, the hologram may be displayed via a wearable device of the user, augmented or virtual reality device, or the like. Aspects described herein may also be used to process events in the metaverse.

In some examples, the generated hologram may be used to indicate duress. For instance, in some examples, a user may request to process an event and may indicate duress (e.g., by selecting a particular option, by swiping in a particular pattern, by using a particular code or identification number, or the like). In some examples, the identification of duress may be based on physiological indicators captured by one or more sensors in a user device, such as a mobile device. Accordingly, when generating the hologram, the system may generate the hologram to include a duress signal that may allow the event to process but may flag the event for investigation, alert authorities, or the like.

In some examples, the hologram may be used to authenticate a proxy user for an authenticated user. For instance, an authorized user may request to send the generated hologram to a user device associated with a different user (e.g., a proxy user) who may then use the hologram to authenticate and process a transaction on behalf of and with permission of the authorized user.

Figure 5:
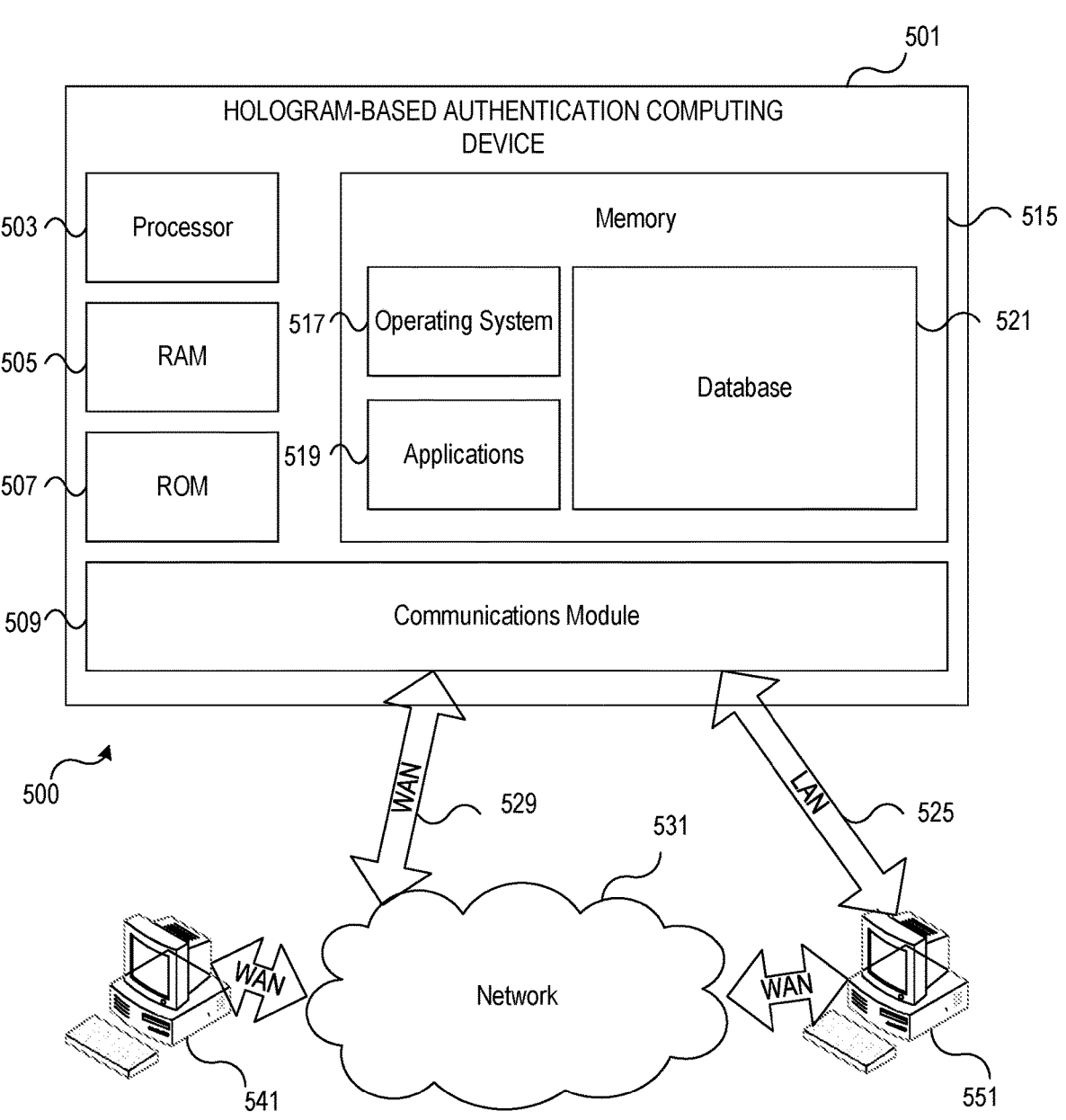
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include hologram-based authentication computing device 501 having processor 503 for controlling overall operation of hologram-based authentication computing device 501 and its associated components, including Random Access Memory (RAM) 505, Read-Only Memory (ROM) 507, communications module 509, and memory 515. Hologram-based authentication computing device 501 may include a variety of computer readable media. Computer readable media may be any available media that may be accessed by hologram-based authentication computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by hologram-based authentication computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on hologram-based authentication computing device 501. Such a processor may execute computer-executable instructions stored on a computer-readable medium.

Software may be stored within memory 515 and/or storage to provide instructions to processor 503 for enabling hologram-based authentication computing device 501 to perform various functions as discussed herein. For example, memory 515 may store software used by hologram-based authentication computing device 501, such as operating system 517, application programs 519, and associated database 521. Also, some or all of the computer executable instructions for hologram-based authentication computing device 501 may be embodied in hardware or firmware. Although not shown, RAM 505 may include one or more applications representing the application data stored in RAM 505 while hologram-based authentication computing device 501 is on and corresponding software applications (e.g., software tasks) are running on hologram-based authentication computing device 501.

Communications module 509 may include a microphone, keypad, touch screen, and/or stylus through which a user of hologram-based authentication computing device 501 may provide input, and may also include one or more of a speaker for providing audio output and a video display device for providing textual, audiovisual and/or graphical output. Computing system environment 500 may also include optical scanners (not shown).

Hologram-based authentication computing device 501 may operate in a networked environment supporting connections to one or more other computing devices, such as computing device 541 and 551. Computing devices 541 and 551 may be personal computing devices or servers that include any or all of the elements described above relative to hologram-based authentication computing device 501.

The network connections depicted in FIG. 5 may include Local Area Network (LAN) 525 and Wide Area Network (WAN) 529, as well as other networks. When used in a LAN networking environment, hologram-based authentication computing device 501 may be connected to LAN 525 through a network interface or adapter in communications module 509. When used in a WAN networking environment, hologram-based authentication computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive biometric data of a plurality of users;
receive a request to process an event, the request to process the event including identification of a user requesting to process the event;
retrieve, based on the identification of the user requesting to process the event, biometric data of the user;
generate, in response to the received request to process the event, a hologram including the biometric data of the user;
display the generated hologram;
provide, as authentication data and in response to a request for biometric authentication data of the user, the displayed generated hologram to an authentication reader device;
receive, from the authentication reader device, a captured image of the generated hologram;
compare the captured image of the generated hologram to the generated hologram to determine whether the user is authenticated;

responsive to determining that the generated hologram does not match the captured image of the generated hologram, deny the request to process the event; and responsive to determining that the generated hologram does match the captured image of the generated hologram, process the event;

determine whether a predetermined time period has expired; and responsive to determining that the predetermined time period has expired, delete the generated hologram.

2. The computing platform of claim 1, wherein generating the hologram including the biometric data of the user includes embedding a digital watermark in the generated hologram, and wherein determining whether the generated hologram matches the captured image of the generated hologram further includes determining whether the captured image of the generated hologram includes the digital watermark embedded in the generated hologram.

3. The computing platform of claim 2, wherein the digital watermark is dynamically generated for one-time use.

4. The computing platform of claim 2, wherein a location or position of the digital watermark in the generated hologram varies.

5. The computing platform of claim 1, further including instructions that, when executed, cause the computing platform to:

generate a cryptographic hash of the generated hologram; and generate a cryptographic hash of the captured image of the generated hologram, wherein comparing the captured image of the generated hologram to the generated hologram to determine whether the user is authenticated further includes comparing the cryptographic hash of the generated hologram to the cryptographic hash of the captured image of the generated hologram to determine whether a match exists.

6. The computing platform of claim 1, further including instructions that, when executed, cause the computing platform to:

transmit the generated hologram to a user computing device for display, wherein displaying the generated hologram includes displaying the generated hologram on a display of the user computing device, and wherein providing, as authentication data and in response to the request for biometric authentication data of the user, the displayed generated hologram to an authentication reader device includes hovering the user computing device over the authentication reader device without contacting a surface of the authentication reader device.

7. The computing platform of claim 1, wherein the request to process the event includes at least one of: a request to access a secure location, a request to access an account, or a request to process a transaction.

8. The computing platform of claim 1, further including instructions that, when executed, cause the computing platform to:

detect, based on sensor data from a user computing device, an indicator of duress, wherein generating the hologram including the biometric data of the user includes generating the hologram including a signal of duress.

9. A method, comprising:

receiving, by a computing platform, the computing platform having at least one processor and memory, biometric data of a plurality of users;

receiving, by the at least one processor, a request to process an event, the request to process the event including identification of a user requesting to process the event;

retrieving, by the at least one processor and based on the identification of the user requesting to process the event, biometric data of the user;

generating, by the at least one processor and in response to the received request to process the event, a hologram including the biometric data of the user;

displaying, by the at least one processor, the generated hologram;

providing, by the at least one processor and as authentication data and in response to a request for biometric authentication data of the user, the displayed generated hologram to an authentication reader device;

receiving, by the at least one processor and from the authentication reader device, a captured image of the generated hologram;

comparing, by the at least one processor, the captured image of the generated hologram to the generated hologram to determine whether the user is authenticated;

when it is determined that the generated hologram does not match the captured image of the generated hologram, denying, by the at least one processor, the request to process the event;

when it is determined that the generated hologram does match the captured image of the generated hologram, processing, by the at least one processor, the event;

determine whether a predetermined time period has expired; and responsive to determining that the predetermined time period has expired, delete the generated hologram.

10. The method of claim 9, wherein generating the hologram including the biometric data of the user includes embedding a digital watermark in the generated hologram, and wherein determining whether the generated hologram matches the captured image of the generated hologram further includes determining whether the captured image of the generated hologram includes the digital watermark embedded in the generated hologram.

11. The method of claim 10, wherein the digital watermark is dynamically generated for one-time use.

12. The method of claim 10, wherein a location or position of the digital watermark in the generated hologram varies.

13. The method of claim 9, further including:

generating, by the at least one processor, a cryptographic hash of the generated hologram; and generating, by the at least one processor, a cryptographic hash of the captured image of the generated hologram, wherein comparing the captured image of the generated hologram to the generated hologram to determine whether the user is authenticated further includes comparing the cryptographic hash of the generated hologram to the cryptographic hash of the captured image of the generated hologram to determine whether a match exists.

14. The method of claim 9, further including:

transmitting, by the at least one processor, the generated hologram to a user computing device for display, wherein displaying the generated hologram includes displaying the generated hologram on a display of the user computing device, and wherein providing, as authentication data and in response to a request for biometric authentication data of the user, the displayed generated hologram to an authentication reader device includes hovering the user computing device over the authentication reader device without contacting a surface of the authentication reader device.

15. The method of claim 9, wherein the request to process the event includes at least one of: a request to access a secure location, a request to access an account, or a request to process a transaction.

16. One or more non-transitory computer-readable media storing instructions that, when executed by a computing platform comprising at least one processor, memory, and a communication interface, cause the computing platform to:

receive biometric data of a plurality of users;

receive a request to process an event, the request to process the event including identification of a user requesting to process the event;

retrieve, based on the identification of the user requesting to process the event, biometric data of the user;

generate, in response to the received request to process the event, a hologram including the biometric data of the user;

display the generated hologram;

provide, as authentication data and in response to a request for biometric authentication data of the user, the displayed generated hologram to an authentication reader device;

receive, from the authentication reader device, a captured image of the generated hologram;

compare the captured image of the generated hologram to the generated hologram to determine whether the user is authenticated;

responsive to determining that the generated hologram does not match the captured image of the generated hologram, denying the request to process the event; and responsive to determining that the generated hologram does match the captured image of the generated hologram, processing the event;

determine whether a predetermined time period has expired; and responsive to determining that the predetermined time period has expired, delete the generated hologram.

17. The one or more non-transitory computer-readable media of claim 16, wherein generating the hologram including the biometric data of the user includes embedding a digital watermark in the generated hologram, and wherein determining whether the generated hologram matches the captured image of the generated hologram further includes determining whether the captured image of the generated hologram includes the digital watermark embedded in the generated hologram.

18. The one or more non-transitory computer-readable media of claim 17, wherein a location or position of the digital watermark in the generated hologram varies.

19. The one or more non-transitory computer-readable media of claim 16, further including instructions that, when executed, cause the computing platform to:

generate a cryptographic hash of the generated hologram; and generate a cryptographic hash of the captured image of the generated hologram, wherein comparing the captured image of the generated hologram to the generated hologram to determine whether the user is authenticated further includes comparing the cryptographic hash of the generated hologram to the cryptographic hash of the captured image of the generated hologram to determine whether a match exists.

20. The one or more non-transitory computer-readable media of claim 16, further including instructions that, when executed, cause the computing platform to:

transmit the generated hologram to a user computing device for display, wherein displaying the generated hologram includes displaying the generated hologram on a display of the user computing device, and wherein providing, as authentication data and in response to a request for biometric authentication data of the user, the displayed generated hologram to an authentication reader device includes hovering the user computing device over the authentication reader device without contacting a surface of the authentication reader device.

* * * * *